United States Patent Office 3,212,620
Patented Oct. 19, 1965

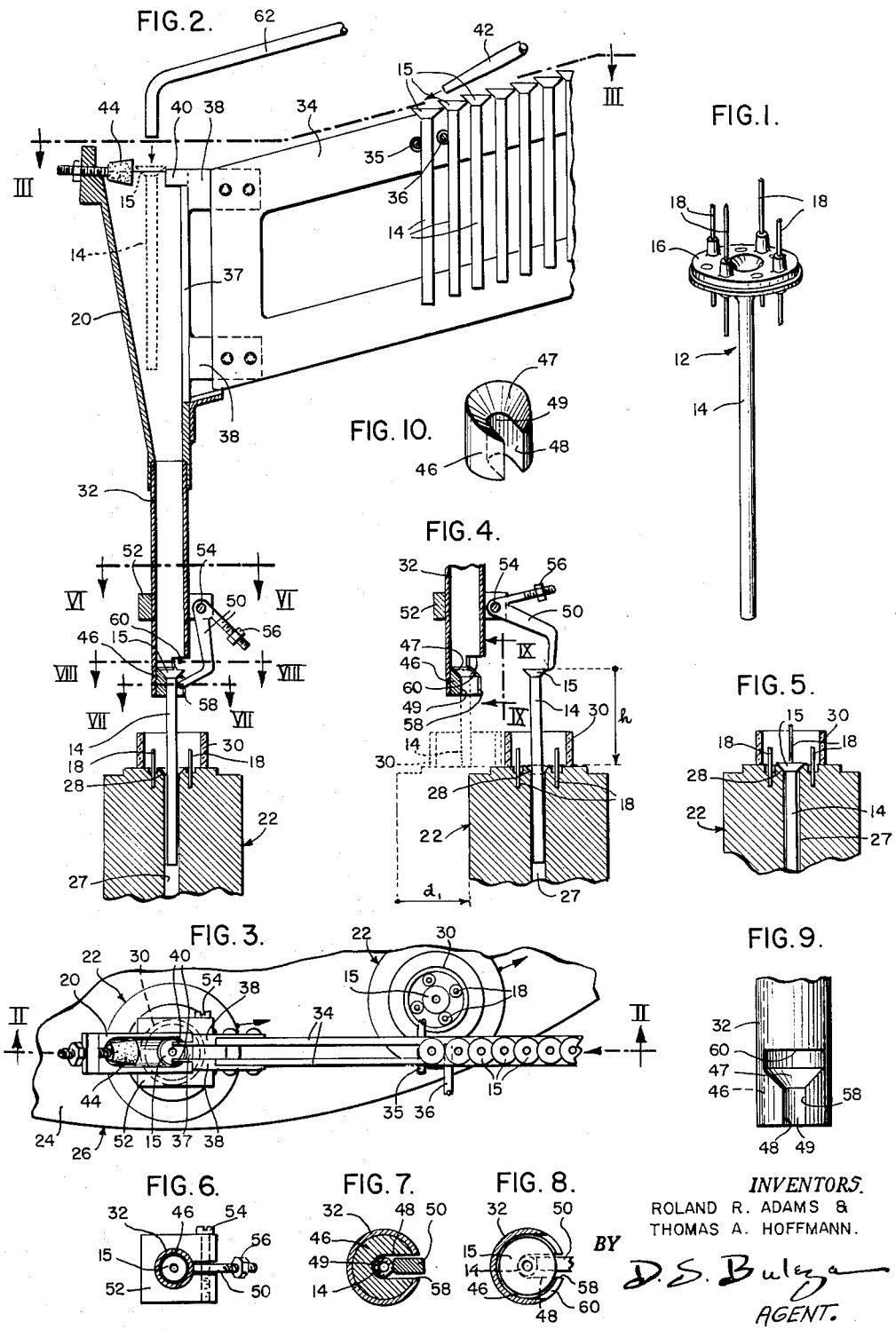

3,212,620
METHOD AND APPARATUS FOR FEEDING TUBULAR ARTICLES INTO A WORK HOLDER
Roland R. Adams, Springfield, and Thomas A. Hoffmann, Morris Plains, N.J., assignors to Westinghouse Electric Corporation, East Pittsburgh, Pa., a corporation of Pennsylvania
Filed July 13, 1962, Ser. No. 209,514
8 Claims. (Cl. 198—26)

This invention relates to means for handling tubular articles and, more particularly, to a method and apparatus for automatically orienting and feeding flared exhaust tubes into an automatic stem-making machine of the type employed in the manufacture of electric lamps and the like.

The glass stems for electric lamps and similar devices are conventionally manufactured on high speed machines having a plurality of work holders or heads that receive and hold the parts in the desired position while the heads are advanced from a loading station (or stations) through a series of work stations. Certain types of incandescent projection lamps require a so-called "wafer" type stem. These stems generally comprise a molded glass disk or wafer that is tubulated and provided with a plurality of pin terminals that are sealed through the wafer at preselected points around its periphery. Such wafer stems are made by feeding a glass collar, a flared exhaust tube and the required number of pin terminals into the head of the stem machine at various loading stations, and then indexing the head through heating and molding stations where the glass components are subjected to glass-working fires and fused together to form a unitary stem structure.

Since the exhaust tubes are flared at one end and thus must be properly oriented before they can be inserted into the apertures in the stem heads, conventional transfer devices cannot be used. The exhaust tubes were, accordingly, heretofore loaded manually at great expense.

With the foregoing in mind, it is the general object of the present invention to provide means for automatically orienting and then feeding a flared tubular article into a work holder that is adapted to receive the tubular end of the article.

Another and more specific object is the provision of apparatus for automatically feeding flared exhaust tubes into the head of a high speed stem-making machine as the heads are sequentially positioned at a tube-loading station.

Still another object is the provision of a simple inexpensive method for automatically orienting and feeding a flared tubular article into a work holder utilizing the force of gravity.

The foregoing objects, and other advantages which will become obvious to those skilled in the art, are achieved according to this invention by feeding the flared exhaust tubes tubular end downward into a chute that is mounted at the tube-loading station of the stem machine and extends upwardly from the head positioned at this station. A guide member located at the bottom of the chute receives the falling tubes and, in conjunction with a retaining member, properly orients the tubular end portion of the falling tube and guides it into the aperture of the stem head. The guide member and retaining means are so constructed that they subsequently arrest the downward travel of the tube by engaging the flared portion thereof, and then permit the loaded tube to pass out of the feeding apparatus when the head is indexed from the tube-loading station to the succeeding station.

A method for aligning the tubular end portion of a falling tubular article with the aperture in a work holder without the use of a mechanical retaining member is also disclosed.

A better understanding of the invention will be obtained from the accompanying drawing, wherein:

FIGURE 1 is a perspective view of a wafer stem for an incandescent projection lamp, which stem requires a flared exhaust tube and presents the feeding problems mentioned above;

FIG. 2 is an elevational view, partly in section along line II—II of FIG. 3, of the tube orienting and feeding apparatus according to a preferred form of the present invention, together with the associated head of an automatic stem-making machine;

FIG. 3 is a plan view of the tube-feeding apparatus and the segment of the stem machine along the reference line III—III of FIG. 2, in the direction of the arrows;

FIG. 4 is a fragmentary side elevational view, partly in section, of the stem head and lower portion of the tube-feeding apparatus illustrating the action of the retaining member as the loaded head is indexed away from the tube-loading station;

FIG. 5 is a similar view of the loaded stem head after it has been advanced beyond the tube-loading station;

FIG. 6 is a horizontal cross-sectional view along the reference line VI—VI of FIG. 2 illustrating the manner in which the retaining member is pivotally attached to the chute;

FIGS. 7 and 8 are enlarged cross-sectional views along the horizontal reference lines VII—VII and VIII—VIII, respectively, of FIG. 2 illustrating the coaction between the guide member, retaining member, the interposed exhaust tube, and the apertured lower portion of the chute;

FIG. 9 is an enlarged elevational view of the apertured lower portion of the tube-feeding apparatus along the reference line IX—IX of FIG. 4; and FIG. 10 is an enlarged perspective view of the guide member that is mounted within the lower end of the feeding chute.

While the invention can be advantageously used to automatically feed various types of flared tubular articles, it is particularly adapted for use in automatically feeding flared exhaust tubes into the head of a stem-making machine and has, accordingly, been so illustrated and will be so described.

The present invention is directed to the feeding problems encountered in the manufacture of certain types of stems, such as the wafer stem 12 illustrated in FIG. 1, which require flared exhaust tubes. As there shown, such stems consist of a molded glass wafer 16 that has a plurality of terminal pins 18 sealed therethrough and an axially extending exhaust tube 14 that is fused to the underside of the wafer and communicates with a centrally located aperture therein. Such stems are customarily mass produced on an automatic stem-making machine having a rotatable turret that carries a series of spaced stem heads located along its periphery. These heads are provided with pockets and apertures adapted to receive the pins and glass components at various loading stations and hold them in proper relationship with respect to one another as the heads are subsequently indexed through a series of work stations where the heating, molding, etc. operations necessary to form the unitary stem assembly are performed. Such stem-making machines and the manner in which the glass components are fused together to form the stem are well known in the art.

The present invention relates to an apparatus and method for automatically orenting and then guiding the flared exhaust tubes into the stem heads located at the tube-loading station of the stem-making machine, and these will now be described.

A side elevational and a plan view of a preferred feeding apparatus and the associated head of the stem machine are shown in FIGS. 2 and 3, respectively. As there shown, the feeding apparatus comprises a stationary chute 20 that is supported at the tube-loading station of the stem-making machine in such a position that it extends upwardly from the stem head 22 that is positioned at that station.

As shown more particularly in FIG. 3, a series of such heads 22 are located along the periphery of the turret 24 of the stem-making machine 26 in the usual manner. The chute 20 and the associated tube-dispensing and guiding means are supported in a predetermined position at the tube-loading station so that the stem heads 22 are sequentially indexed into a position directly below the chute, and then to the next work station as the turret 24 is periodically advanced or indexed. Thus, each of the heads 22 move laterally along a predetermined arcuate path from the tube-loading station, that is, from left to right along a circular path relative to the chute as viewed in FIGS. 2 and 3 and denoted by the arrows in FIG. 3.

As shown more particularly in FIG. 2, each of the stem heads 22 is provided with an aperture 27 that is adapted to freely receive the tubular end portions of the flared exhaust tubes 14. The aperture 27 extends axially of the head and the upper face of the head is flared around the mouth of the aperture to provide a tapered recess 28 conformed to nestingly receive the flared end 15 of the exhaust tube. It will be noted that the stem head carries the terminal pins 18 and a glass collar 30, which components are positioned in encircling relationship with the exhaust tube 14 and aperture 27 and are loaded into the head before it is indexed into the tube-loading station. The glass collar 30 is heated and molded at the succeeding work stations to form the wafer 16 which joins the terminal pins and exhaust tube together in the finished stem 12 shown in FIG. 1.

As shown in FIGS. 2 and 3, the flared exhaust tubes 14 are inserted one at a time tubular end downward into the upper end of the chute 20 as the stem heads 22 are sequentially positioned at the tube-loading station below the constricted lower end or throat 32 of the chute. Any suitable means for inserting the tubes into the chute at the proper time can be employed. In the particular case here illustrated, this is achieved by a conveyor consisting of an inclined track 34 formed by a pair of spaced rails that are secured to and extend upwardly from the upper end of the chute 20. The exhaust tubes 14 are loaded onto the track from a hopper (not shown) by a suitable feeding mechanism such as that shown in U.S. Patent No. 1,536,833 issued May 5, 1925, to J. T. Fagan et al. The flared ends 15 of the exhaust tubes 14 ride along the track 34 and the tubes are fed into the chute 20 one at a time by a suitable escapement mechanism such as a pair of pins 35 and 36 which are sequentially actuated at the proper time to allow the first tube in the stacked row to escape and slide down the track into the chute through a side opening 37. Such escapement means are well known in the art.

In this particular embodiment, the chute 20 and associated guide means are held in position above the stem head 22 by means of paired brackets 38 attached to the upper and lower portions of the track. The upper pair of brackets are desirably provided with ears or projections 40, the upper edges whereof are spaced to provide a lateral extension of the track 34. Thus, the released exhaust tube 14 is fed by gravity down the inclined track 34, over the upper pair of brackets 38 and projections 40 thereof and through the slot-like opening 37 into the chute 20 tubular end downward, as indicated by the broken-line showing of the exhaust tube in FIG. 2.

Since the tubes 14 must be fed through the chute into the stem head within a predetermined time, a stream of compressed air is desirably trained down the track 34 from a nozzle 42 (see FIG. 2) that is located just behind the escapement pins 35 and 36 to insure the positive feeding of the released exhaust tubes into the chute.

The lateral motion of the exhaust tubes 14 fed into the upper end of the chute 20 from the track 34 is desirably arrested by means of a resilient stop 44 of rubber or the like that is attached to the upper end of the chute and positioned therein at a point directly opposite the extensions 40 of the upper pair of brackets 38. The tubes are, accordingly, oriented in such a manner that they drop tubular end downward vertically through the chute 20.

As shown most clearly in FIG. 2, the upper portion of the chute 20 is flared outwardly slightly and merges with the lower end or constricted throat 32. The throat is of cylindrical configuration and only slightly larger than the flared end 15 of the exhaust tubes 14, as illustrated in FIG. 8. The precise orientation of the tubular end of the falling tube 14 with the stem head 22 is accomplished in accordance with this invention by means of a guide member 46 that is mounted within the lower end of the chute throat 32, which guide member will now be described.

As will be noted in FIG. 10, the guide member 46 comprises a generally cylindrical block having a tapered upper surface 47 that merges with a slot-like opening 48 which extends laterally from the side of the member to approximately the center thereof. The upper surface of the guide member is conformed to have substantially the same profile as the flared end 15 of the exhaust tube 14 and thus provides an inwardly tapered seat for this portion of the tube and an upstanding reference surface or aligning seat 49 for the tubular portion of the tube.

As illustrated in FIGS. 2 and 3, the guide member 46 is located in such a position within the bottom of the chute throat 32 that the inward terminus of the opening 48 is substantially aligned with the aperture 27 in the head 22 positioned at the tube-loading station, and said opening extends laterally in the direction in which the head will subsequently be indexed away from the tube loading station. Moreover, the upstanding seat 49 formed by the portion of the guide member opposite the mouth of the opening 48 is located so that it is aligned with the left-hand edge of the aperture 27 in the stem head, as viewed in FIG. 2. That is to say, the inward terminus of the opening 48 defines an arcuate upstanding reference surface 49 that is substantially aligned with a predetermined edge of the aperture 27 in the head 22 and is adapted to nestingly receive and pass only the tubular portion of the tube.

Thus, when the tubular end portion of the falling exhaust tube 14 engages the tapered and upstanding surfaces of the guide member 46, it is automatically aligned with the aperture 27 in the stem head as it falls past and through the guide member. Since the end of the chute throat 32 and guide member 46 mounted therein are spaced from the head 22 a distance considerably less than the length of the exhaust tube 14, the tubular end of the falling tube is automatically guided by the chute and the guide member into the aperture 27 in the stem head.

In order to insure that the tubular end portion of the falling exhaust tube 14 seats against the guide member 46, a suitable retaining member such as an elongated probe or finger 50 (FIGS. 2 and 4) is pivoted at a predetermined point above the guide member so that the end of the finger is swingable through and out of the opening 48 laterally in the same direction as the stem head 22 moves when it is indexed away from the tube-loading station.

As is shown in FIGS. 2, 3, 4 and 6, the finger 50 may be conveniently supported in the proper position by providing a V-shaped bend therein and pivoting it within a slotted bracket 52 with a pin 54 that passes through a hole located at the apex of the V, which bracket is fastened to the chute throat 32. The finger is counterbalanced by means of an adjustable weight such as a nut 56, for example, so that the tip of the finger normally rests or presses against the vertical aligning surface 49 defined by the guide member 46. Hence, when the tubular end of the falling exhaust tube enters the guide member 46 through the opening 48, it pushes the finger 50 aside from its normal position and passes downwardly through the opening. Concurrently, the counterbalanced finger exerts a lateral force against the falling tube which seats the tubular portion thereof against the vertical aligning surface of the guide member as it slides past this surface, as illustrated in FIG. 7. The tubular end portion of the falling exhaust tube 14 is thus guided into the stem head aperture 27 without arresting the downward motion of the tube.

When the flared end 15 of the tube 14 reaches the guide member 46, it nestingly engages the tapered seat 47 and is locked in such position by the lateral pressure exerted by the retaining finger 50. The downward motion of the tube is thus stopped when the tube is only partly inserted into the stem head 22 and the tube comes to rest in the position shown in FIG. 2.

When the loaded head is indexed away from the tube-loading station and advances a distance $d_1$, as shown in FIG. 4, the loaded exhaust tube 14 is carried laterally out of the chute throat 32 through the opening 48 in the guide member 46 and a similarly positioned and shaped aperture 58 provided in the chute throat. As shown more particularly in FIG. 9, the throat 32 is also provided with a larger and upwardly tapered aperture 60 that merges with the aperture 58 and is dimensioned to permit the lateral passage of the flared portion 15 of the loaded tube.

When the loaded head 22 has advanced a distance greater than $d_1$, the tip of the finger 50 clears the flared end 15 of the exhaust tube 14 and swings back into the opening 48 in guide member 46 thus releasing the exhaust tube. The tube then falls the remaining distance $h$ (see FIG. 4) into the head 22 and seats itself in the tapered recess 28 therein, as shown in FIG. 5.

It has been found that the exhaust tubes 14 are fed into the guide member 46 with greater rapidity and precision if a downward force is applied to the tubes as they fall down the chute 20. Thus, a nozzle 62 is desirably mounted above the chute and oriented to dispense a jet of compressed air downwardly into the chute and against the flared ends 15 of the exhaust tubes 14 fed into the chute from the track 34, as shown in FIG. 2.

It will be appreciated from the foregoing that the objects of the invention have been achieved by providing a simple and very convenient means for automatically orienting and feeding flared tubular articles, such as exhaust tubes, into a movable work holder. Since the alignment of the tubular end of the article with the work holder is accomplished by utilizing the force of gravity and a specially shaped and precisely oriented reference surface, the feeding apparatus requires very little maintenance and is very rugged and inexpensive.

While one embodiment has been illustrated and described in detail, it will be appreciated that various modifications in both the apparatus and method can be made without departing from the spirit and scope of the invention.

For example, the application of lateral pressure to the falling exhaust tube required to maintain the tubular portion thereof against the upstanding reference or aligning surface of the guide member may be accomplished by using compressed air jets instead of a mechanical retaining finger. If the air nozzle or nozzles are located at the tube-loading station in a position adjacent to but out of the line of movement of the protruding portions of the loaded exhaust tubes, the air jets can be made to impinge upon the upstanding reference surface defined by the guide member without interfering with the lateral movement of either the loaded tube or stem head. By properly adjusting the velocity and angle of the air stream, a controlled laterally-directed force and a retaining action can be obtained which will be substantially identical to that provided by the counterbalanced finger.

We claim as our invention:

1. In combination with a work holder that is movable laterally along a predetermined path from a loading station and has an aperture therein, apparatus for orienting and feeding a flared tubular article into the aperture in said work holder when the latter is located at said loading station, which apparatus comprises;
   (a) a chute at said loading station located above the path of said work holder and adapted to receive a flared article tubular end downward and convey it by gravity toward said work holder when the latter is positioned at said loading station below said chute,
   (b) means located at the bottom of said chute for receiving and orienting flared articles as they fall through said chute comprising an upstanding guide member having an opening therethrough that passes only the tubular end portion of the received article and extends laterally in a direction such that the article can be carried out of said guide member by said work holder when said article is loaded into said holder, the portion of said guide member opposite the mouth of said opening being contoured to provide an upwardly extending seat for the tubular portion of the article that is adapted, when engaged thereby, to align the tubular end portion of the article with and guide it into the aperture of said positioned work holder, and
   (c) a retaining member pivoted at a point above said guide member such that it is swingable through and away from the opening therein and normally presses against the upwardly extending seat portion thereof.

2. The combination set forth in claim 1 wherein: said guide member is mounted within the lower end of said chute, and the latter is provided with an opening that is aligned with and extends above the opening in said guide member and is adapted to permit the lateral passage of both the flared and adjacent tubular portions of an article seated in said guide member.

3. The combination comprising:
   (a) a work holder that is movable along a predetermined lateral path from a loading station and has an aperture adapted to receive the tubular end portion of a flared tubular article; and
   (b) means for automatically feeding a flared tubular article into said work holder when the latter is positioned at said loading station, comprising;
      (1) a stationary chute at said loading station disposed above and extending upwardly from said positioned work holder,
      (2) means for inserting one of said flared tubular articles tubular end downward into the upper end of said chute,
      (3) a guide member located at the lower end of said chute adapted to receive articles as they fall through said chute, said guide member having a slot-like opening therethrough that extends in the direction of the path of movement of said work holder and is of a size such that it permits the passage of only the tubular portion of the received article, the upstanding portion of said guide member opposite the mouth of said opening being contoured to provide a seat that is oriented to align the tubular end portion of an article seated thereagainst with the aperture in said positioned work holder, and
      (4) a retaining member pivotally mounted outside said chute at a predetermined point above said guide member and swingable through and upwardly away from the opening in said guide member,
   said chute having an opening therein that is aligned with the opening in said guide member and extends upwardly to permit the lateral passage of the flared and adjacent tubular portions of an article seated in said guide member and carried by said positioned work holder, and said retaining member being counterbalanced in a manner such that an end portion thereof normally is located in the opening in said guide member and rests against the upstanding seat defined by said guide member.

4. The combination of a movable work holder and an automatic article orienting-and-feeding means set forth in claim 3 wherein, the upper surface of said guide member which surrounds the opening in said guide member is provided with an inwardly tapered recess of substantially the same configuration as the flared portion of the tubular article, and the portion of said chute adjoining said guide member is only slightly larger than the flared portion of the tubular article.

5. In an automatic stem-making machine having a plurality of heads that are sequentially indexed laterally along a predetermined path through a plurality of work stations including a loading station and are each provided with an aperture adapted to receive the tubular end portion of a vitreous flared exhaust tube when said heads are sequentially positioned at said loading station, apparatus for orienting and feeding an exhaust tube into each of said heads when the latter are sequentially positioned at said loading station, compirsing;

(a) a stationary chute located at said loading station and extending upwardly from the path of movement of said heads, (b) means for inserting a flared exhaust tube tubular end downward into the upper end of said chute, (c) means located at the bottom of said chute for receiviing an exhaust tube falling through said chute and leading the tubular end of said tube into the aperture of the head positioned therebelow at said loading station, said receiving-and-leading means comprising a guide member having a slot-like opening therethrough that is dimensioned and oriented to permit only the tubular portion of an exhaust tube falling through said chute to pass downwardly through said guide member and then laterally out of said guide member when the head and loaded exhaust tube are subsequently advanced from said loading station, the upper portion of said guide member being tapered toward said opening and the upstanding portion of said member opposite the mouth of said opening being contoured to provide a seat portion that is oriented to align the tubular portion of a received exhaust tube with the aperture in the head positioned at said loading station, the spacing between said guide member and said positioned head being less than the length of the tubular portion of said exhaust tube, and (d) a counterbalanced retaining finger pivotally mounted at a point above said guide member and outside said chute such that the end of said finger normally rests against the upstanding seat portion of said guide member and is swingable in an arc through and upwardly away from the opening in said guide member in the direction in which the heads advance from said loading station.

6. The tube orienting-and-feeding apparatus set forth in claim 5 wherein said tube inserting means comprises an inclined track that is adapted to engage the flared ends of the exhaust tubes and gravitationally convey the tubes tubular end downwardy into the upper end of the chute through a side opening therein.

7. The tube orienting-and-feeding apparatus set forth in claim 6 wherein, a nozzle for dispensing a stream of compressed air downwardly through the chute is mounted above said chute, and means for arresting the lateral motion of exhaust tubes conveyed into the chute by said track is mounted in the upper end of said chute.

8. The method of orienting a tubular article and feeding it into a work holder that has an aperture adapted to receive the end of said article, which method comprises, providing an upstanding member that is conformed to receive the end portion of said article and guide it along a predetermined path when said portion is seated against said member, positioning said work holder below said member so that the guiding surface of the latter is aligned with a predetermined edge of the aperture in said work holder, dropping said article from a point above said guide member and positioned work holder, directing the fall of said article so that it passes said member on the side thereof at which the aperture in said work holder is located, and applying a laterally directed force of sufficient magnitude to said article as it falls past said guide member to press the falling article against said member and thus guide it into the aperture in said positioned work holder without arresting the fall of said article.

References Cited by the Examiner

UNITED STATES PATENTS

| | | | |
|---|---|---|---|
| 743,182 | 11/03 | Meyer | 221—307 X |
| 1,597,439 | 8/26 | Fagan et al. | 198—26 |
| 1,990,258 | 2/35 | Trutner | 65—139 |
| 2,161,469 | 6/39 | Holm | 198—24 |
| 2,355,311 | 8/44 | Linkner | 221—278 X |
| 2,377,294 | 5/45 | Belada et al. | 198—26 X |
| 2,493,785 | 1/50 | Strickland et al. | 221—165 X |
| 2,558,633 | 6/51 | Tuttle | 198—26 |
| 2,637,144 | 5/53 | Gardner et al. | 65—139 |
| 2,678,763 | 5/54 | Baer | 221—307 X |
| 3,082,909 | 3/63 | Hawkes | 221—278 X |

LOUIS J. DEMBO, *Primary Examiner.*

KENNETH N. LEIMER, RAPHAEL M. LUPO,
*Examiners.*